United States Patent
Biel et al.

[15] 3,676,492
[45] July 11, 1972

[54] AMINO ACID AMIDES OF DISUBSTITUTED PHENETHYLAMINES

[72] Inventors: John Hans Biel, Lake Bluff, Ill.; Irwin L. Klundt, Brookfield, Wis.

[73] Assignee: Aldrich Chemical Company

[22] Filed: Dec. 9, 1970

[21] Appl. No.: 96,615

[52] U.S. Cl. .................260/559 A, 260/309, 260/326.14 R, 260/519, 260/562 A, 424/324
[51] Int. Cl. .......................................................C07c 103/38
[58] Field of Search ..................260/559, 562, 326.14, 519, 260/309

[56] References Cited

UNITED STATES PATENTS 3,340,298  9/1967  Wismayr et al. .......................260/562

Primary Examiner—Henry R. Jiles
Assistant Examiner—Harry I. Moatz
Attorney—Robert L. Niblack

[57] ABSTRACT

Amino acid amides of disubstituted phenethylamines represented by the formula:

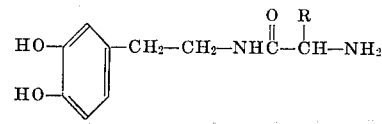

wherein R is hydrogen, lower alkyl, hydroxymethyl, hydroxybenzyl, β-hydroxyethyl, mercaptomethyl, methylmercaptoethyl, 3-indolylmethyl, carboxymethyl, β-carboxyethyl, γ-quanidinopropyl, Δ-aminobutyl, or 5-imidazolylmethyl; and the pharmaceutically acceptable acid addition salts thereof. The compounds are useful as renal vasodilators and antihypertensive agents.

6 Claims, No Drawings

AMINO ACID AMIDES OF DISUBSTITUTED PHENETHYLAMINES

This invention relates to novel amino acid amides of disubstituted phenethylamines which are useful as renal vasodilators and hypertensive agents.

The compounds of this invention are represented by the formula

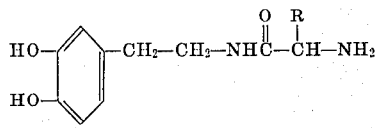

wherein R is hydrogen, lower alkyl, hydroxymethyl, hydroxybenzyl, β-hydroxyethyl, mercaptomethyl, methylmercaptoethyl, 3-indolylmethyl, carboxymethyl, β-carboxyethyl, γ-guanidinopropyl, Δ-aminobutyl, or 5-imidazolylmethyl; and the pharmaceutically acceptable acid addition salts thereof.

The term "lower alkyl" as used herein, refers to both straight and branched chain $C_1$–$C_5$ alkyl groups including methyl, ethyl, n-propyl, iso-propyl, n-butyl, sec-butyl, tert-butyl, iso-butyl, n-pentyl, iso-pentyl, neo-pentyl, and the like.

The term "pharmaceutically acceptable acid addition salts" refers to non-toxic acid addition salts which are generally prepared by reacting the amides of this invention with a suitable organic or inorganic acid. Representative salts include the hydrochloride, hydrobromide, sulfate, bisulfate, acetate, oxalate, valerate, oleate, laurate, borate, benzoate, lactate, phosphate, tosylate, citrate, maleate, fumarate, succinate, tartrate, and the like.

Representative compounds of the present invention include the following:

N-3′,4′-Dihydroxy-β-phenethyl-L-alanine amide
N-3′,4′-Dihydroxy-β-phenethyl-L-tyrosine amide
N-3′,4′-Dihydroxy-β-phenethyl glycine amide
N-3′,4′-Dihydroxy-β-phenethyl-DL-valine amide hydrochloride
N-3′,4′-Dihydroxy-β-phenethyl-D-isoleucine amide oxolate
N-3′,4′-Dihydroxy-β-phenethyl-L-leucine amide tartrate
N-3′,4′-Dihydroxy-β-phenethyl-L-phenylalanine amide
N-3′,4′-Dihydroxy-β-phenethyl-D-serine amide sulfate
N-3′,4′-Dihydroxy-β-phenethyl-L-threonine amide
N-3′,4′-Dihydroxy-β-phenethyl-L-cysteine amide
N-3′,4′-Dihydroxy-β-phenethyl-DL-methionine amide
N-3′,4′-Dihydroxy-β-phenethyl-L-tryptophane amide
N-3′,4′-Dihydroxy-β-phenethyl-D-aspartylamide, tosylate
N-3′,4′-Dihydroxy-β-phenethyl-DL-glutamyl amide
N-3′,4′-Dihydroxy-β-phenethyl-L-arginine amide
N-3′,4′-Dihydroxy-β-phenethyl-D-lysine amide
N-3′,4′-Dihydroxy-β-phenethyl-DL-histidine amide The compounds of this invention are renal vasodilators and have been found to significantly increase renal blood flow in test animals. The compounds are particularly useful in the treatment of renal hypertension. The increase in renal arterial blood flow was measured in dogs as follows: A 9 mm electromagnetic flow probe is surgically implanted around the right renal artery of each test animal. The terminal conductor is brought out through the animal's skin near the scapula and secured. The terminal conductor is then coupled to a lead wire from a Carolina Medical Electronics two-channel electromagnetic flowmeter, and recordings are made on a Grass polygraph. Changes from control levels of flow after administration are calculated on a percent basis. Generally speaking, dosages of 30 mg/kg of body weight have been found to increase the renal blood flow in dogs from 75 to 100 percent for up to 5 hours.

The compounds can be administered in dosages of from 250 to 750 mg three times a day to hypertensive patients to control their blood pressure. In treating shock, larger initial dosages of from 10 to 30 mg/kg of body weight can be employed.

While the compounds can be administered as the free base, it is generally preferred to employ the compounds as their pharmaceutically acceptable acid addition salts. Presently preferred compounds are those wherein R is hydrogen, methyl, or p-hydroxybenzyl.

Generally speaking, the compounds of this invention are prepared by reacting 3-4′-dibenzyloxy-β-phenethylamine with a suitable carbobenzoxy D, L, or DL amino acid, hydrogenating the resulting amide in the presence of methanol and acid, and working up the resulting amide. The starting materials are known compounds and can be prepared by literature methods.

The following examples further illustrate the present invention.

EXAMPLE 1

Preparation of N-3′,4′-Dihydroxy-β-phenethyl-L-Alanine Amide Hydrochloride

A solution of 11.1 g (0.03 mole) of 3,4-dibenzyloxy phenethylamine hydrochloride in 100 ml of methanol was treated with 1.62 g (0.03 mole) of dry sodium methoxide, the solvent was removed in vacuo and the residue dissolved in 100 ml of acetonitrile, filtered, and evaporated to dryness. This was treated with 20 ml of acetonitrile and 40 ml of dry tetrahydrofuran (THF) and warmed until solution was complete. To the warm mixture was added 4.46 g (0.02 mole) of carbobenzoxy-L-alanine. The solution was stirred until it was clear and then 4.95 g (0.024 mole) of dicyclohexylcarbodiimide was added. An immediate exothermic reaction took place and a white precipitate started to form. The reaction was allowed to stand at room temperature for 3 hours and then filtered to remove 5.2 g (96.6 percent of theory) of dicyclohexylurea. The filtrate was diluted with 10 ml of THF, warmed to 40° and 2 ml of acetic acid was added to the reaction. The solvent was removed in vacuo and the solid residue dissolved in chloroform, washed twice with 100 ml of 2 N hydrochloric acid, washed with 100 ml of saturated sodium chloride, washed twice with 100 ml of saturated sodium bicarbonate, washed with 100 ml of saturated sodium chloride, and dried over anhydrous magnesium sulfate. Removal of the solvent gave 10.1 g (94 percent) of a white solid. This was recrystalized from 125 ml of ethanol to give 4.8 g of [N′-carbobenzoxy-L-alanyl]-N-[3,4-dibenzyloxy-β-phenethyl] amine, m.p. 151.5°–152.5°, $[\alpha]^{23}{}_D$ - 8.6° (1.6 percent $CHCl_3$).

Analysis Calcd. for $C_{33}H_{34}N_2O_5$: C, 73.58; H, 6.38; N, 5.20
Found : C, 73.26; H, 6.15; N, 5.23

To 250 ml of methanol containing 0.5 ml (6.2 mmol) of concentrated hydrochloric acid was added 2.7 g (5.0 mmol) of the above-prepared amine and 300 mg of 10 percent palladium on carbon. The solution was hydrogenated at atmospheric pressure. Theoretical uptake was 380 ml, actual uptake 365 ml (96 percent). The starting material was not soluble but as the reaction progressed the material dissolved. The catalyst was removed by filtration and the solvent was evaporated in vacuo. The solid was azeotroped dry with ethanol (2 ×50 ml), triturated with 50 ml of hot acetonitrile, and filtered to yield 1.15 g of N-3′,4′-dihydroxy-β-phenethyl-L-alanine amide hydrochloride, m.p. 214°–218° (dec). $[\alpha]^{24}{}_D$- 36.4° (2.08 percent, $H_2O$).

Analysis calcd. for $C_{11}H_{17}ClN_2O_3$: C, 50.67;H,6.52;Cl,13.63 ;N,10.75;O,18.43.
Found: C,50.69;H,6.31;Cl,13.77;N,10.64;O,18.63.

EXAMPLES 2 – 4

The following compounds were prepared according to the method of Example 1, by substituting the appropriate carbobenzoxyamino acid for carbobenzoxy-L-alanine.

N-3′,4′-Dihydroxyphenethyl-L-tyrosine amide, hemisulfate, m.p. 86°–91°.
N-3′,4′-Dihydroxyphenethyl-L-tyrosine amide, oxalate, m.p. 163°–167°.
N-3′,4′-Dihydroxyphenethylglycine amide oxalate, m.p. 173°–175°.

The compounds useful in the practice of the present invention are generally formulated into pharmaceutical compositions comprising, as an active ingredient, at least one of the active agents in association with a pharmaceutical carrier or diluent. The compounds useful in the practice of the invention exhibit both oral and parenteral activity and can be formulated in dosage forms for oral or parenteral administration.

Solid dosage forms for oral administration include capsules, tablets, pills, powders and granules. In such solid dosage forms, the active compound is admixed with at least one inert diluent such as sucrose, lactose or starch. Such dosage forms can also comprise, as is normal practice, additional substances other than inert diluents, e.g., lubricating agents such as magnesium stearate, sweetening and flavoring agents, and the like. In the case of capsules, for example, the active agent may be the sole ingredient.

Liquid dosage forms for oral administration include, pharmaceutically acceptable emulsions, solutions, suspensions, syrups, and elixirs containing inert diluents commonly used in the art, such as water. Besides inert diluents, such compositions can also include adjuvants, such as wetting agents, emulsifying and suspending agents, and sweetening, flavoring and perfuming agents.

Preparations according to this invention for parenteral administration include sterile aqueous or non-aqueous solutions, suspensions or emulsions. Examples of non-aqueous solvents or vehicles are propylene glycol, polyethylene glycol, vegetable oils, such as olive oil and injectable organic esters such as ethyl oleate. Such dosage forms may also contain adjuvants such as preserving, wetting, emulsifying and dispersing agents. They may be sterilized by, for example, filtration through a bacteria-retaining filter, by incorporating sterilizing agents into the compositions, by irradiating the compositions, or by heating the compositions. They can also be manufactured in the form of sterile solid compositions which can be dissolved in sterile water, or some other sterile injectable medium immediately before use.

The dosage of active ingredient in the compositions of this invention may be varied; however, it is necessary that the amount of the active ingredient shall be such that a suitable dosage form is obtained. The selected dosage depends upon the desired therapeutic effect, on the route of administration, and on the duration of the treatment.

We claim:

1. A compound of the formula

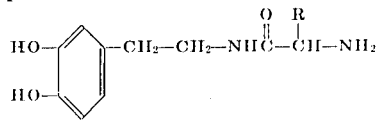

wherein R is hydrogen, lower alkyl, hydroxymethyl, hydroxybenzyl, β-hydroxyethyl, mercaptomethyl, methylmercaptoethyl, 3-indolylmethyl, carboxymethyl, β-carboxyethyl, γ-guanidinopropyl, Δ-aminobutyl, or 5-imidazolylmethyl; and a pharmaceutically acceptable acid addition salt thereof.

2. A compound in accord with claim 1 wherein R is hydrogen, lower alkyl, hydroxymethyl, or hydroxybenzyl.

3. A compound in accord with claim 1 wherein R is hydrogen, methyl or hydroxybenzyl.

4. A compound in accord with claim 1: N-3',4'-dihydroxy-β-phenethyl-L-alanine amide or a pharmaceutically acceptable acid addition salt thereof.

5. A compound in accord with claim 1: N-3',4'-dihydroxy-β-phenethyl-L-tyrosine amide or a pharmaceutically acceptable acid addition salt thereof.

6. A compound in accord with claim 1: N-3',4'-dihydroxy-β-phenethylglycine amide or a pharmaceutically acceptable acid addition salt thereof.

* * * * *